(12) United States Patent
Liang et al.

(10) Patent No.: US 10,936,204 B2
(45) Date of Patent: Mar. 2, 2021

(54) MANAGING LIFESPAN OF A FLASH MEMORY

(71) Applicant: EMC IP Holding Company LLC, Hopkinton, MA (US)

(72) Inventors: Shuang Liang, Los Altos, CA (US); Philip N. Shilane, Newtown, PA (US); Grant R. Wallace, Pennington, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 45 days.

(21) Appl. No.: 16/351,043

(22) Filed: Mar. 12, 2019

(65) Prior Publication Data
US 2019/0212921 A1 Jul. 11, 2019

Related U.S. Application Data

(63) Continuation of application No. 15/281,576, filed on Sep. 30, 2016, now Pat. No. 10,228,868.

(51) Int. Cl.
*G06F 12/00* (2006.01)
*G06F 3/06* (2006.01)

(52) U.S. Cl.
CPC .......... *G06F 3/0616* (2013.01); *G06F 3/0634* (2013.01); *G06F 3/0653* (2013.01); *G06F 3/0659* (2013.01); *G06F 3/0679* (2013.01); *G06F 12/00* (2013.01)

(58) Field of Classification Search
CPC .... G06F 3/0634; G06F 3/0616; G06F 3/0653; G06F 3/0679; G06F 12/0246; G06F 12/00; G06F 3/0659; G06F 2212/7204; G06F 3/06

USPC ........................................................ 711/103
See application file for complete search history.

(56) References Cited

U.S. PATENT DOCUMENTS

| 7,783,666 B1* | 8/2010 | Zhuge ................... G06F 16/122 707/783 |
| 8,656,088 B2 | 2/2014 | Belluomini |
| 8,862,807 B2 | 10/2014 | Yoon |
| 8,977,677 B2* | 3/2015 | Salamatov .............. H04L 67/10 709/203 |
| 9,122,524 B2* | 9/2015 | Mathur ................. G06F 9/4893 |
| 9,183,137 B2 | 11/2015 | Schmier |
| 9,189,268 B2* | 11/2015 | Rama .................... G06F 9/4843 |
| 9,563,511 B1* | 2/2017 | Foley .................... G06F 3/0659 |
| 9,778,878 B2 | 10/2017 | Hodgdon |
| 10,277,529 B2* | 4/2019 | McClean .............. H04L 47/781 |
| 10,681,078 B2* | 6/2020 | Humphries ......... G06F 21/6218 |
| 2012/0017034 A1 | 1/2012 | Maheshwari |

(Continued)

FOREIGN PATENT DOCUMENTS

GB 2491004 A 11/2012

*Primary Examiner* — Pierre Miche Bataille
(74) *Attorney, Agent, or Firm* — Workman Nydegger

(57) ABSTRACT

Systems and methods for managing content in a flash memory and to managing a lifespan of the flash memory. The lifespan is managed by throttling writes when usage exceeds certain quotas. The throttling may be performed in a cooperative manner such that the clients writing to the flash memory can implement their own throttling. The quotas are not rigid and allow flexibility to certain situations. When excessive quota is used, future quotas can be managed to bring the overall usage into an expected range.

19 Claims, 3 Drawing Sheets

(56) References Cited

U.S. PATENT DOCUMENTS

| | | | |
|---|---|---|---|
| 2012/0066439 A1* | 3/2012 | Fillingim | G06F 11/3055 |
| | | | 711/103 |
| 2013/0081014 A1* | 3/2013 | Kadatch | G06F 3/067 |
| | | | 718/1 |
| 2013/0145075 A1* | 6/2013 | Huang | G06F 12/0866 |
| | | | 711/103 |
| 2013/0145077 A1 | 6/2013 | Huang | |
| 2014/0244918 A1 | 8/2014 | Maheshwari | |
| 2015/0032948 A1 | 1/2015 | Yoon | |
| 2016/0248676 A1* | 8/2016 | Thanasekaran | G06F 3/067 |

\* cited by examiner

MANAGING LIFESPAN OF A FLASH MEMORY

CROSS-REFERENCE TO RELATED APPLICATIONS

This application is a Continuation of U.S. patent application Ser. No. 15/281,576, filed Sep. 30, 2016, to issue as U.S. Pat. No. 10,228,868 on Mar. 12, 2019, the disclosure of which is incorporated by reference herein in its entirety.

FIELD OF THE INVENTION

Embodiments of the invention relate to systems and methods for managing memory. More particularly, embodiments of the invention relate to systems and methods for managing a lifetime of a flash memory such as a solid state drive (SSD).

BACKGROUND

As the amount of data in computing systems continues to increase, there is a strong desire for improvements that allow datasets to be efficiently processed. DRAM (Dynamic Random Access Memory) and the like are often too small or too expensive to efficiently process large data sets. Algorithms that process data out-of-core (e.g., using storage such as Hard Disk Drives (HDDs)) tend to be slow.

One potential solution to this problem is to introduce flash memory into the computing systems. Often, the flash memory is introduced as an additional memory layer or tier between DRAM and HDDs. Flash memory can be quite large in size and can accommodate many different computing scenarios. Flash memory is faster than HDDs and has the capacity to accelerate dataset analysis. Even though flash memory can improve the processing capability of the computing systems, there is a need to effectively managing flash memory.

Flash memory, like other hardware devices, has an expected lifespan. The expected lifespan of a flash memory is often expressed in terms of overwrites. An overwrite may refer to how much data is written to the flash memory. For example, a less expensive solid state drive can be expected to last five years assuming three overwrites per day. If the flash memory has a capacity of 100 Gigabytes (GB) one overwrite corresponds to writing 100 GB of data to the solid state drive. Thus, three overwrites corresponds to writing 300 GB of data to the flash memory. More expensive solid state drives may allow ten overwrites per day for the same lifespan of five years.

Managing the lifespan of a flash memory is not trivial and is complicated by the fact that flash memory may be used by multiple clients that have varying memory requirements and that use flash memory in different ways and at different rates. If writes to the flash memory are not managed, the flash memory may fail prematurely. Systems and methods are needed to manage or maintain the lifespan of a flash memory to ensure that the actual lifespan is substantially the same as the expected lifespan.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
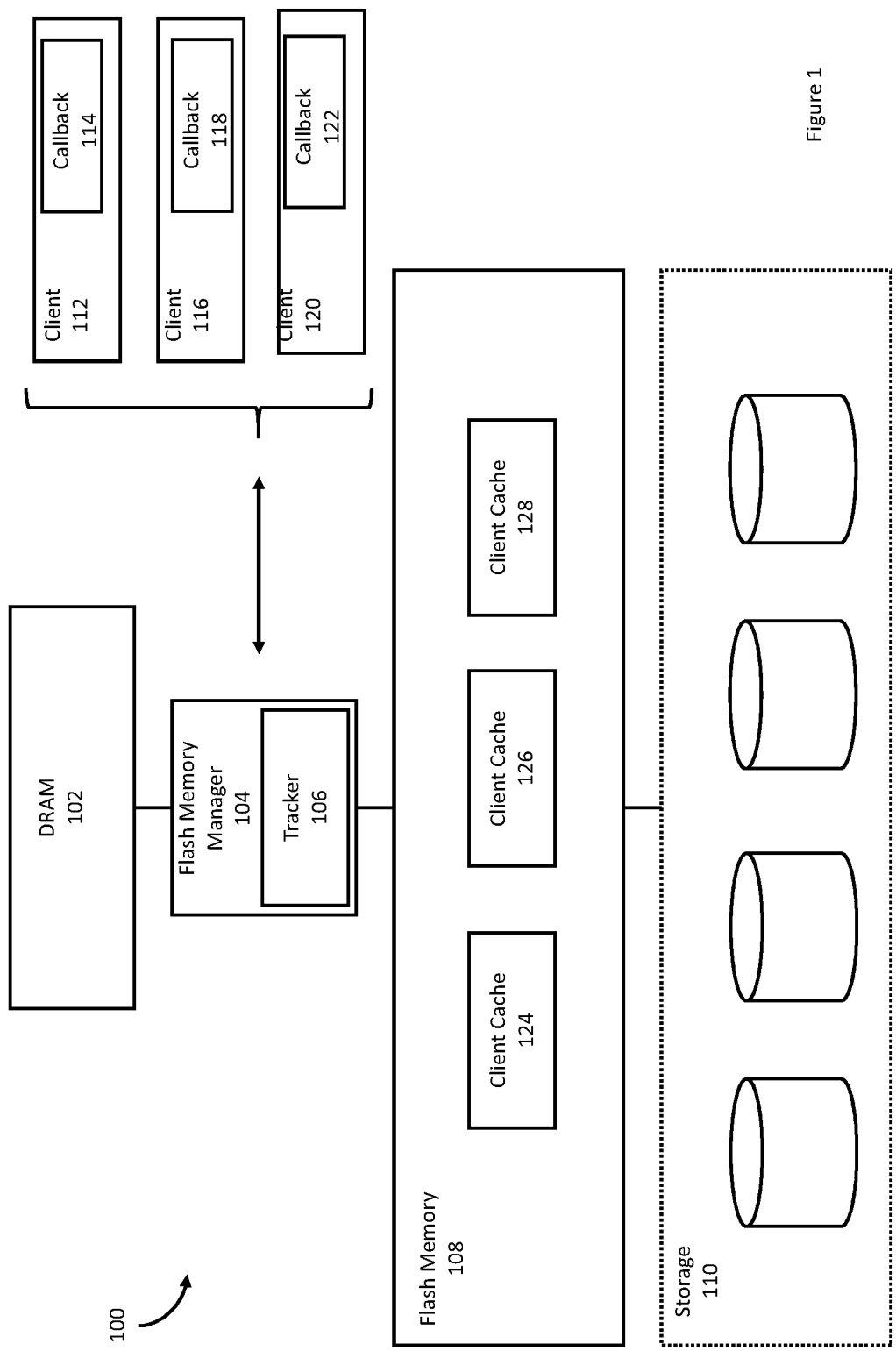
FIG. 1 illustrates an example of a computing environment that includes a flash memory whose lifespan is managed.

Embodiments of the invention relate to systems and methods for managing a lifespan of a flash memory such as a solid state drive or a collection of solid state drives. Because the lifespan of flash memory is often expressed in terms of overwrites, the lifespan of the flash memory can be managed by tracking and potentially controlling writes that are made to the flash memory in a given period of time. When the actual usage of the flash drive exceeds the recommended usage or set usage or when the actual overwrites exceed the recommended or set overwrites, the writes to the flash memory may be throttled or reduced.

Embodiments of the invention may throttle or reduce the input/output (I/O) of the flash memory in a manner that allows the flash memory to process writes as fast as possible. In one example, the flash memory or a flash memory manager works cooperatively with clients of the flash memory to manage the write rates of the clients. This allows the clients to participate in the management of the flash memory. When a client is aware of how the flash memory is being used or of how their allocation or write credits are being used, the client can implement changes in the manner in which writes are performed. The client, for example, can reduce the number of writes to the flash memory. This allows the flash memory to perform writes as fast as possible and does not require the flash memory or a flash memory manager to implement or manage write delays.

The lifespan of a flash memory is managed by controlling how many writes are made to the flash memory in a given period of time. In one example, the writes made to the flash memory may be managed using a credit based quota system. Generally, clients of the flash memory are given a quota or an amount of data that can be written to the flash memory. When the quotas are exceeded or when the overwrites exceed a threshold value (the set quota), writes to the flash memory may be throttled. As previously stated, the responsibility for throttling the writes may be implemented by the client and/or the flash memory manager.

Generally, embodiments of the invention manage the lifespan of the flash memory by implementing a credit based quota system as previously stated. Over time, credits (write credits) are associated with the clients using the flash memory. Credits can be provided on a periodic basis. In one example, the credits may be provided in accordance with a quota. As writes are made to the flash memory, the corresponding credits are decremented accordingly. The credits used or the amount of writes performed can be compared to the quotas to determine whether the flash memory is being used in accordance with its expected lifetime.

As discussed in more detail herein, writes to the flash memory may be throttled when the quotas are exceeded in some instances.

For example, the expected lifetime of a flash memory device may be three overwrites per day for 5 years. The expected usage or writes before failure for this device (assume a 100 GB device) can be determined as follows: 3 WPD (Overwrites per day)×100 GB (size of flash memory)× 365 (days per year)×5 (number of years)=547,500 GB. In other words, it is expected that 547,500 GB can be written to the 100 GB flash memory over five years. This corresponds to 300 GB per day. Normal usage is achieved when 547,500 GB or less is written to the flash memory over five years. Alternatively stated, normal usage is achieved when about 300 GB per day or less is written to the flash memory.

To determine whether the flash memory is being used appropriately or normally, a lifetime or a total quota and a window quota are tracked. The total quota is determined in the context of how long the flash memory has been in use. Thus, the total quota may change over time or as the flash memory ages. Using the previous 100 GB flash memory example, the expected writes over 5 years is 547,500 GB. However, if the flash memory has been installed for only 100 days, then the total quota is determined based on the 100 days. In this example, the total quota would be: 3 WPD×100 GB×100 days=30 TB. In this context, the status of the flash memory (normal usage, excessive usage, etc.) can be determined at any point in time by tracking the total writes to the flash memory.

The window quota may refer to a smaller time period. For example, the window quota may focus on a number of hours (x hours), a day, a week, or the like. When allocating credit to a client, the credit is allocated in accordance with the window size in one embodiment.

Usage of the flash memory with respect to the total quota and the window quota may be determined as follows:

total writes fraction=(total writes−total allowed writes)/total allowed writes;

window writes fraction=(window writes−window allowed writes)/window allowed writes.

These values (the total writes fraction and the window writes fraction) are negative when the total writes or the window writes are less than, respectively, the total allowed writes and the window allowed writes. These values are positive when the total writes or window writes are more than, respectively, the total allowed writes and the window allowed writes.

There are multiple options for determining whether to throttle writes to the flash memory. For example, when the window writes fraction and the total writes fraction are both less than zero, new writes are allowed because negative values indicate that the actual usage or actual writes is less than expected or allowed.

When the window writes fraction is negative and the total writes fraction is positive, this indicates that the flash experienced a bursty write situation previously (a situation that required a large number of writes) and indicates that the flash memory is returning to the correct number of writes or to normal usage. In this case, the time until the total writes fraction reaches zero is calculated. If the time is less than a threshold, the flash memory should be writeable, otherwise flash memory is set to not be writeable or to be throttled. When the total writes fraction reaches zero, this indicates that the number of overwrites is at the value needed to achieve the expected lifespan of the flash memory.

When the window writes fraction is positive and the total writes fraction is negative, this indicates that the flash memory is in a bursty situation where a large number of writes may be required. In this case, the flash memory is writeable.

When the window writes fraction is positive and the total writes fraction is positive, this indicates that the bursty situation has continued for too long. In this case, and the flash memory is set to not be writeable for a period of time or is throttled for a certain time period.

When throttling becomes necessary, throttling methods can be implemented by the flash memory manager itself (e.g., the flash cache manager or flash memory controller), by clients of the flash memory, or by combinations thereof In some examples, the flash memory manager may provide information to the clients. The information informs the clients about their use of the flash memory relative to their quotas. In a hybrid or cooperative technique, the flash memory manager may monitor client writes and inform clients of their write totals or usage, without enforcing write limits. The flash memory manager may monitor client writes and prevent poorly behaving clients from writing too frequently to the flash memory. As a further modification, the flash memory manager may begin to enforce write limits when a client has failed to self-throttle and has exceeded certain thresholds.

Determining when over-usage has occurred and should be acted on has subtleties. For example, it may be permissible for a client to over-use the flash memory (perform too many writes) for a short period of time (e.g., an hour, a day or a week) as long as the average usage is acceptable. This may be permitted as long as usage returns to normal within a certain time period. This may require writes to be throttled such that normal usage is achieved within a time threshold. For example, if writes exceed a quota by 100 GB during a week, embodiments of the invention may throttle the writes such that writes are 100 GB below quota for the following week. This ensures that the usage returns to normal within a threshold time period.

For example, and using the 100 GB flash memory previously discussed, assume that the flash memory is 3 days old. The total quota is 900 GB. If a client has written 1,200 GB, then the flash memory manager may require normal usage to be established within three days. This would effectively throttle the clients to 200 GB per day for the next three days. In this scenario, the total usage for 6 days would be 1,800 GB and the actual writes for those 6 days would also be 1,800 GBs. On the seventh day, normal write usage would be permitted and throttling would be removed.

As discussed in more detail herein, embodiments of the invention account for situations where clients use less than their allocated credit. For example, the excess credit of a client could be shared with another client that may be using too much credit. A client may be allowed to exceed their quota in some situations. Over time, however, embodiments of the invention may also change the quota (e.g., temporarily lower the quota or borrow credits from another client) such that the writes to the flash memory do not exceed a set amount over a longer period of time. Embodiments of the invention manage writes such that the writes to the flash memory are in line with expected writes. This allows embodiments of the invention to ensure that the flash memory lasts as long as the flash memory is expected to last.

This example is further expanded by considering the window quota. If the window is five hours, then the window quota is 62.5 GB. In effect, the client is given 62.5 GB credit every five hours. Stated differently, the writes actually performed by the client may be compared with the writes allowed as set forth above during the window. This allows the flash memory manager to determine whether the quota has been exceeded (e.g., when the write fraction is positive) during the window. Thus, the flash memory manager can determine the rates at which writes are being performed from at least two perspectives: the present lifetime of the device and a window of time.

In effect, clients are given credits that they can use to write to the flash memory. When the credits are exhausted, the client's writes may be throttled. Tracking writes in this manner, however, also allows the credits to be shared. For example, if two clients are using the flash memory and one of the clients has exceeded the relevant quotas, that client may borrow from the other client such that the client is not throttled. In one example, the borrowed credits are not always deducted from the client from whom credits were borrowed. Stated differently, the flash memory manager can dynamically assess the total write fraction and the window write fraction. The actual values of these fractions correspond to the amount of data that can be written to the flash memory. This amount of data can then be allocated to other clients.

By providing quota credits in this manner, there may be instances where a client exceeds their quota. In this example, excessive writes can be balanced by requiring the client to return to the quota or to normal usage within some period of time. For example, if a client has exceeded their window quota by 10 GB for each of 5 successive windows (50 GB of excessive writes), the allowed writes for the following 5 windows may be reduced such that normal usage is restored within a time threshold of 5 windows. Trend lines or other metrics may be used to determine whether a client is expected to return to normal or allocated usage over time. Further, these limits may not be imposed if the client is trending towards normal usage.

There are several situations where clients are allowed to exceed their quotas. For example, when the flash memory is being used initially, it may be necessary to allow a large number of bytes to be written to the flash memory. This may cause a client to exceed their normal quotas. In this case, when the flash memory is new, the clients may be allocated extra credits. Thereafter, credits to quotas may be allocated over time. For example, the credits may be issued each day or according to another time period or based on the window size. There may be other situations where quotas may be exceeded (e.g., high priority operations like restoring a backup or the like). When the accumulated credits become negative (i.e. more has been written than credits issued), embodiments of the invention may consider throttling the usage of the flash memory.

In one example, multiple quotas (e.g., the total quota and the window quota) may be used to aid in determining whether to throttle the use of the flash memory. By using multiple quotas, certain situations that require high use of the flash memory for a limited time can be detected and allowed.

The window quota reflects use of the flash memory for a given time period (e.g., x number of hours, day, week, etc.). For example, a five hour window quota may be associated with a certain amount of writes such as 50 GB. At 3 pm, the window quota can be compared with amount of data written to the flash memory between 10 am and 3 pm. At 4 pm, the window quota can be compared with the amount of data written to the flash memory between 11 am and 4 pm.

In one example, the windows may be viewed as overlapping. In other words, the writes performed by a client associated with a five hour window can be reevaluated every hour. This may correspond to windows, for example, from 8 am to 1 pm, from 9 am to 2 pm, etc. Alternatively, the windows may be evaluated in a non-overlapped manner. This corresponds to windows of, 8 am to 1 pm and then 1 pm to 6 pm. In either case, the credits for a given window can be compared with the writes performed during the same window. Further, using different types of windows can allow trends in usage to be detected.

Thus, the window quota represents usage of the flash memory, in particular writes to the flash memory, with respect to a window of time. When the writes to the flash memory exceed the window quota for a client, the client may need to be throttled at least temporarily. As previously stated, the window quota may be evaluated together with the total quota.

Embodiments of the invention may track the writes made to the flash memory using trackers. The trackers may track writes to the flash memory as a whole. Thus, the writes may be tracked in the context of a total quota and a window quota associated with the entire flash memory. The tracker may track writes for each client of the flash memory separately. Thus, each client of the flash memory may be associated with a set of quotas. This allows clients to be throttled individually. In addition, it allows clients to share their credits.

The quotas for multiple clients may depend on how much of the flash memory is allocated to the clients. If a client receives half of the flash memory, the client is associated with half of the quota (e.g., total quota/2). Alternatively, the quota may be associated with expected usage and not necessarily with allocated size. If a client is expected to perform 60% of the writes but needs less than half of the flash memory, the client may receive 60% of the quota (e.g., 60% of the allowed writes).

The ability to throttle writes may be implemented at the flash memory, for example, by a flash memory manager (the flash memory manager may be implemented by a flash memory controller). In addition, the flash memory manager may work cooperatively with the clients and give the clients the ability to throttle themselves. The flash memory manager may provide clients with quota statistics (e.g., how much lifetime or total quota is left, what the current window usage is relative to the window quota, the total writes fraction, the total window fraction, etc.). This allows each client to throttle their own writes based on their own use of the flash memory. Managing the lifespan becomes a cooperative effort between the client and the flash memory manager and it may not be necessary for the flash memory manager to implement or manage write delays. The flash memory manager, however, may retain the ability to throttle clients that do not act in a cooperative manner.

When the writes made to the flash memory exceed a quota or a set of different quotas, for example, the writes may be throttled or discarded by the flash memory manager or by the client, particularly when the flash memory is a cache because it is not necessary to perform every write to a cache. When the quota or set of quotas is exceeded, efforts may be made to account for the excess writes at a later time by changing quotas for an appropriate period of time. This allows the overwrite expectations of the flash memory to be satisfied over a longer period of time.

The systems and methods for throttling use of the flash memory discussed herein allow writes to the flash memory to be processed at the maximum possible speed. Clients of the flash memory can choose to stop writing to the flash memory or write in a selective manner, allowing the flash memory to process the writes.

In a typical implementation, a flash memory may be used by multiple clients (e.g., a meta-data client, a index client, etc.). For example, a backup service may be associated with multiple clients where each client performs various tasks associated with backing up data or accessing backed up data. In order to manage the lifespan of the flash memory for all clients, all clients can be notified of their usage by a flash memory manager. The clients of the flash memory, as discussed herein and depending on context, usually refer to the threads or processes or software that is performing an application that may require use of the flash memory.

A quota may be referred to as a credit-based quota and a flash memory may be associated with multiple quotas as previously stated. Because a flash memory may include distinct drives or devices, each device may be associated with a lifetime quota. This allows specific devices to be replaced as necessary.

To understand the credit based quota system further, a client may be associated with write thresholds. If a single client is using the flash memory, the total size of writes performed by the client is tracked such that the size of the writes can be determined in the context of the total quota. The size of the writes are also tracked in the context of the window quota.

The window threshold or quota of the above example is 62.5 GB and the total quota may depend on how long the flash memory has existed in the computing system. When at least one of these thresholds or quotas is exceeded by the client, the client may be throttled. Thus, if the client has written more than 62.5 GB during the last five hours or during the relevant window, the client may be throttled for some period of time until normal usage is reestablished. If the client has written more than the total quota, the client may be throttled. For example, if the flash memory has existed for 100 days and the client has written more than 30 TB, the client may be throttled going forward for some period of time. By tracking the total size of the writes in this manner, the usage of the flash memory can be evaluated.

Returning the flash memory to a normal usage state can include providing the clients with fewer credits or by temporarily changing the quotas. By change to the quotas or credits can be determined by evaluating the rate at which the flash memory is returning to the normal or expected usage.

As previously stated, embodiments of the invention allow quotas to be exceeded as long as the flash memory usage returns to normal, for example, within a predetermined time limit. In one example, when a client is associated with a total quota and a window quota, embodiments of the invention may allow one of the quotas to be exceeded, but not both quotas. This may accommodate situations where a large number of writes are written in a relatively short period of time (e.g., during a restore operation). Even in this situation, various writes may have certain priorities or characteristics that allow the writes to occur even if both quotas are exceeded. However, the flash memory may implement measures to return to normal usage after these types of writes are completed.

In one example, if both the window quota and the total quota are below their respective thresholds (e.g., the writes fractions are negative) or if the client still has credit, writes to the flash memory are allowed.

If the window quota is below its threshold and the total quota is fully used, this indicates that there was a previous need to perform a large number of writes and that use of the flash memory is returning to normal. In this situation, the time needed for the quotas to return to normal is calculated. If the time is less than a threshold time, then the flash memory is writable. If the time is not less than the threshold, the flash memory is throttled to the degree necessary to return to a normal quota usage within the time threshold.

If the window quota is over quota and the total quota is still available (e.g., the window quota write fraction is positive and the total quota write fraction is negative) or credits are still available, this indicates that a situation is occurring where a large number of writes are required. In this case, the flash memory is writable. If the usage of the flash memory exceeds both quotas, then the flash memory is set to not be writable in some examples or is throttled in other examples. For example, one or more clients may be throttled such that usage returns to normal within a time threshold.

Embodiments of the invention support multiple clients. In one example, a client may be a software module or process or thread that uses the flash memory (often referred to herein as a flash cache) to improve performance. Quotas can be assigned to the clients in different ways, for example in a prioritized manner, an equitable manner, a preferential manner, or the like. For example, a client may be allocated 40% of the cache and 50% of the overall quota. These allocations can be set by a customer, determined dynamically and/or adjusted based on usage trends, based on expected cache size requirements, or the like. For example, a client may require a substantial amount of memory but may not require a significant amount of writes. Thus, this client may be allocated 50% of the flash memory, but only 20% of the quota. These examples are given by way of example only.

In addition, the systems and methods for managing the flash memory or cache are cooperative in nature. Decisions related to writing to the flash memory can be shared with clients. For example, the cache or flash memory manager may alert a client that their use of the flash memory is close to the quota or threshold or that the quota or threshold has been exceeded. For example, the flash memory manager may note that the client's credits are close to zero (e.g., the write fractions are negative but close to zero) and determine that the client is close to their quota or threshold usage. Providing the client with this information gives the client the ability to determine a response. A client performing a high priority task may continue writing, while low priority tasks may be suspended. In addition, clients may be able to share their quotas with other clients in some examples. Further, a client that understands how fast the credits are being used can also perform writes at certain rates.

Embodiments of the invention relate to systems and methods for measuring usage of the flash memory or tracking writes to the flash memory such that the expected usage and lifespan can be achieved. By tracking the writes to the flash memory, the flash memory manager can control or limit future writes to the flash memory if necessary. For example, a flash memory manager may maintain rolling histograms or window quotas over different timespans. This may include rolling histograms or windows that reflect usage per day, week, month, year, hour(s), or the like. The cumulative usage or writes may also be tracked from different perspectives such as by client or by the whole flash memory. A trend line can be maintained for the flash memory as a whole and/or for each client of the flash memory.

The credit based quota systems and methods can be implemented in different methods. In some examples, a client stops writing when the client runs out of credits globally or during a window. Alternatively, the client may reduce their write rate Different requirements can be created to throttle writes to a flash memory such as an SSD. Such criteria include requiring a threshold score for inserted data (such as access count), requiring a threshold file-priority, or only writing for certain transactions such as client writes versus client reads or not allowing data to be copied from one location to another within the flash memory, such as would happen if a container holding a data segment is deleted, etc.

In addition, the flash memory usage can be divided between clients based on quality of service (QoS) metrics. Clients that require higher performance may be allocated a higher writes/day quota per storage capacity than lower priority QoS clients.

A file (or stream) priority may also be specified. The highest priority streams may continue with normal writing or caching regardless of over-usage. This is to allow very important workloads to continue regardless of the prior flash memory write usage.

When considering QoS metrics, quotas may be assigned by incorporating priorities. When the writes made to the flash memory exceed a quota or a set of different quotas, for example, the writes may be throttled or discarded. When the flash memory is a cache, it may not be necessary to perform every write and some writes may be discarded. When the quota is exceeded, efforts may be made to account for the excess writes at a later time by changing quotas accordingly for an appropriate period of time. This allows the writes to meet a long term goal.

Quotas can be assigned by incorporating priorities. File/Folder/Volume priorities may be incorporated into throttling decisions. Workload priorities may also be considered. Priority levels can be high or normal or based on another schema. In this example, high priority writes are always allowed. After a high priority event, quotas (e.g., window quotas) may be reduced for all clients. In addition, unused quota or credit may be redistributed to the clients when recalculating the quotas for the clients.

In some examples, unused quota or credits may be redistributed periodically. If a client consistently underuses their quota, the quota may be permanently reduced so as to avoid redistributing the quota.

In another implementation, credits (or unused write potential) can be shared among clients so that credits or quota not used by a client can be redistributed to other clients that are more actively writing to the flash memory. In this implementation, the window credit technique remains unchanged, but the global credits of one client can be transferred to another client. In this way, inactive clients can share their global credit with busier clients, but when a previously inactive client becomes active again, it still retains its window quota going forward.

Embodiments of the invention also account for situations where drives are added to, removed from, or replaced in the flash memory during the lifetime of the flash memory. When adding new drives, the number of allowed writes or quotas to the flash memory may be increased because new drives have their full lifetime of writes.

The newly available quota or credit may be distributed to the clients of the flash memory. This may cause a client that had used up its available writes (globally or per window) to now be able to write into the flash memory again. It is not necessary to distribute new quota proportionally.

In the scenario with multiple SSDs with varying write lifespans remaining, wear-leveling may also be implemented. To maintain wear-leveling across the drives included in the flash memory, such that they will reach their end-of-life at the same time, it may be possible to write to the SSDs with longer remaining lifespans preferentially as compared to the SSDs with shorter lifespans. Further, the cache eviction algorithm can incorporate the remaining lifespan of SSDs, along with other caching properties, within the cache when selecting which data to evict to reach balanced usage. By evicting from such SSDs, they will receive more writes and their lifespan will approach the remaining lifespan of other SSDs in the cache. While this achieves wear-leveling, it may not maintain fully parallelized access, which maximizes performance, since the newest SSD is the focus of writes. This type of situation may occur in a flash memory due to, for example, unexpected device failures, which may cause devices in the flash memory to have differing lifespans.

The quotas associated with the flash memory may dynamically adapt to changes in capacity and to changes in the clients of the cache. Adding capacity to the flash memory typically increases the quotas while removing capacity may reduce the quotas. Quotas may also be revised (at least temporarily) following high usage or high priority events that used excessive quota or credits. When the quotas are revised, the quotas may not be distributed equally to the clients. When clients are added to the flash memory, the quotas may be revised proportionally or preferentially.

FIG. 1 illustrates an example of a computing system that includes a flash memory whose lifespan is managed. FIG. 1 illustrates an example of a computing system 100 that includes various memory levels. The system 100 includes DRAM 102, flash memory 108, and storage 110 (e.g., hard disk drive devices/arrays or the like). In this example, the flash memory 108 may be used as a cache.

The computing system 100 may be configured to perform backup operations or other applications. The computing system may also include processors, ports, and other hardware necessary to connect to other devices or networks, such as source devices that store source data to be backed up. The computing system 100 may be configured to backup data received over a local area network, over the Internet, or the like. The computing system 100 may also be used for other applications and may perform tasks like de-duplication on the stored data.

The flash memory 108 may be allocated to clients of the flash memory 108. In this example, clients 112, 116 and 120 use the flash memory 108. The client 112 is allocated client cache 124, the client 116 is allocated client cache 126, and the client 120 is allocated client cache 128. The clients 112, 116, and 120 may be different types of clients that use the flash memory 108 for different reasons. The clients may use the flash memory 108 to improve performance for example and/or as a cache.

The tasks performed by the clients 112, 116 and 120 may depend on the applications being performed in the computing system 100. Further, the flash memory 108 is capable of supporting fewer or additional clients. Further, clients can be dynamically added or removed from the computing system 100. Quotas may be reallocated or recalculated when clients are added/removed and/or when capacity is added/removed.

For example, the client 112 may be an identifier index client that is configured to associate a hash of a data block to a location in the flash memory or other location in the client cache 124 or other memory or storage. The client 116 may be a directory manager that maintains file system information in the client cache 126. The client 120 may maintain locking information in the client cache 128. The clients 112, 116 and 120 may have different priorities that may impact utilization of the flash memory 108.

FIG. 1 further illustrates a flash memory manager 104. The flash memory manager 104 is configured to monitor writes to the flash memory 108 by the clients 112, 116, and 120. In one example, all writes may be processed through or tracked by the flash memory manager 104.

The flash memory manager includes a tracker 106 that is used to track various quotas described with reference to FIG. 2 below and discussed herein. The tracker 106 may track writes performed to the flash memory 108 as a whole and/or performed each of the clients individually. The tracker 106 may track a total quota and a window quota for the flash memory as a whole and for each of the clients. These quotas allow the lifetime of the flash memory 108 to be managed appropriately and ensure that the lifespan of the flash memory 108 is likely to equal or exceed its expected lifespan.

The flash memory manager 104 is capable of communicating with the clients 112, 116, and 120. Messages from the flash memory manager 104 may be provided as a callback 114, 118, and 122 for, respectively, the clients 112, 116, and 120. The callbacks 114, 118 and 122 may include information about the associated quotas of the clients 112, 116 and 120.

For example, when the client 112 is about to exceed one of its quotas, a message can be sent to the client 112 via the callback 114. The callback 114 may include the status of the quota or quotas associated with the client 112. The callback 114 may inform the client 112 which quotas have been exceeded, if any, which quotas are about to be exceeded, how long a quota has been exceeded, or the like or combination thereof. The client 112 can then decide how to respond to the callback 114. The client 112 may slow down the rate at which writes are performed, delay writes to the flash memory 108, discard some writes, or the like. This allows the flash memory manager 104 to process writes at the maximum possible speed and relieves the flash memory manager 104 from implementing write delays or the like.

The flash memory manager 104 and the clients may cooperate to manage the lifespan of the flash memory 108. This cooperative mechanism allows both the flash memory manager 104 and the clients 112, 116 and 120 to participate in managing the lifespan of the flash memory 108. However, the flash memory manager 104 may have the ability to prevent writes in some situations (e.g., when both quotas have been exceeded, when both quotas have been exceeded for a certain amount of time, or the like). Many of the decision points regarding allowing or disallowing writes can also be overridden by users or set by users. Default values may also be set.

Figure 2:
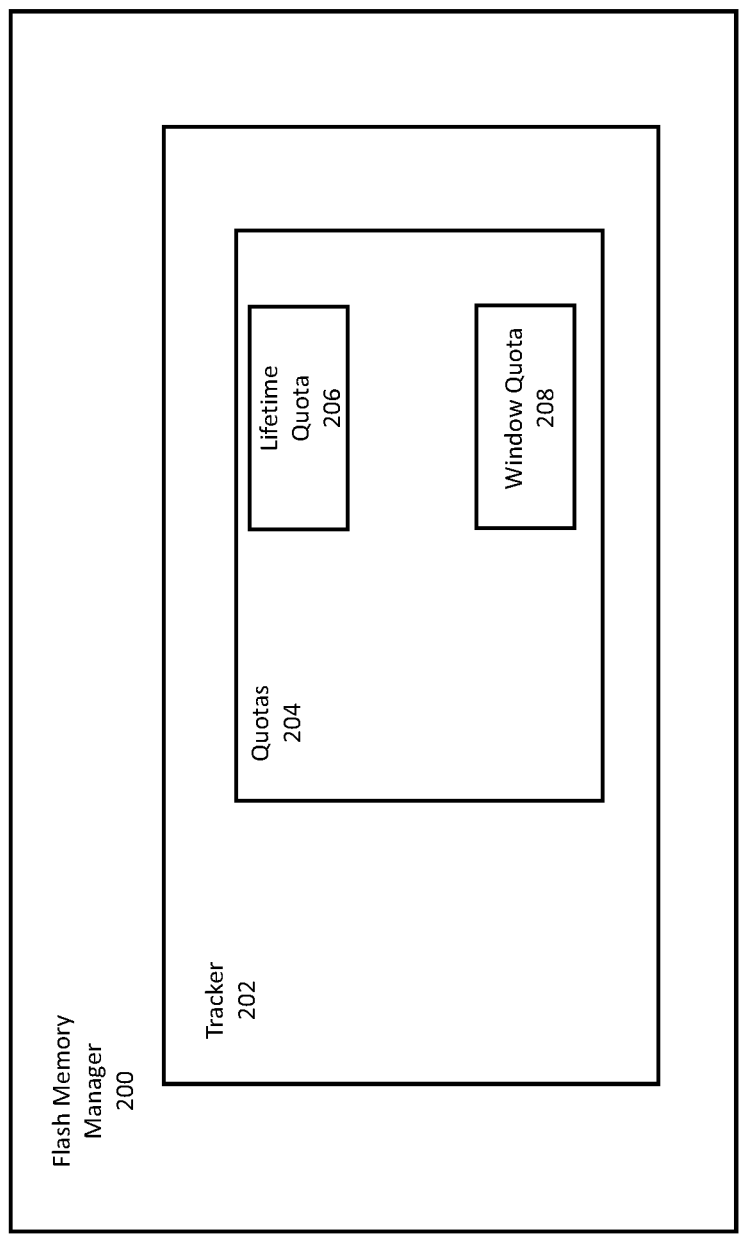
FIG. 2 illustrates an example of a flash memory manager that tracks quotas associated with a flash memory or with clients of a flash memory.

FIG. 2 illustrates an example of a flash memory manager 200. Flash memory manager 200 is an example of the flash memory manager 104. The flash memory manager 200 includes a tracker 202 that tracks quotas 204. The quotas may include, by way of example and not limitation, a lifetime or total quota 206 and at least one window quota 208. Other quotas may be maintained in addition to or in lieu of the illustrated quotas.

The flash memory manager 200 may be responsible for updating the various quotas of each of the clients. By way of example, the window quota 208 of a client may be 100 GB. Thus, the client has 100 GB of write credits. Each time the client writes to the cache, the credits are decremented. Alternatively, the writes fractions may be computed to determine whether the credits have been used. Or to determine if the client is writing too much to the flash memory. When the quota approaches the threshold value (which can be implemented as when the quota reaches 0 or when the total writes for the day approaches 100 GB or when the total writes fraction equals 0), the client may be notified and given the opportunity to self-throttle. Regardless of how the window quota is tracked, a client can be notified when the quota is fully used or close to being fully used. The action taken by the client can consider the priority of the writes being done, whether one or more quotas are close to being used, or the like.

The flash memory manager 200 may also be configured to reallocate quotas when certain events occur, such as adding more flash memory, removing flash memory, or the like.

The flash memory manager 200 may also redistribute excess quota or credits on occasion. In one example, a client that loses excess credits does not, however, necessarily lose its window credits or its rate of accumulation. The quota system can be implemented by the flash memory manager 200, the clients or both.

Referring to FIG. 1, for example, if the flash memory has a size of 100 GB and credit is based on a daily window, the client 112 may be allocated a client cache 124 of 50 GB, the client 116 may be allocated a client cache of 25 GB, and the client 120 may be allocated a client cache 128 of 25 GB. The window quota for the flash memory 108 as a whole, assuming that the flash memory can support 3 overwrites of data per day is 300 GB. If the window quota is allocated proportionally, the client 112 has a window quota or credit of 150 GB (300*0.5) and the clients 116 and 120 each have a window quota or credit of 75 GB (300*0.25). If the window size for each client is five hours instead of a day, the window quota of the client 112 is 150 *(5/24) or 31.25 GB. The window quota for the clients 116 and 120 is 15.625 GB.

In another example, the space allocated to the clients is not proportional to the writes allocated to the clients. Assume that the client 112 is allocated 50 GB of the 100 GB flash memory and that the clients 116 and 120 are each allocated 25 GB of the flash memory. However, the client 112 may receive 60% of the writes while the clients 116 and 120 each receive 20% of the writes. Thus, the window quota or credit for the client 112 (assuming a day window size) is (300 GB*0.6) or 180 GB. This is different from a previous example where the client 112 received a window credit of 150 GB.

Figure 3:
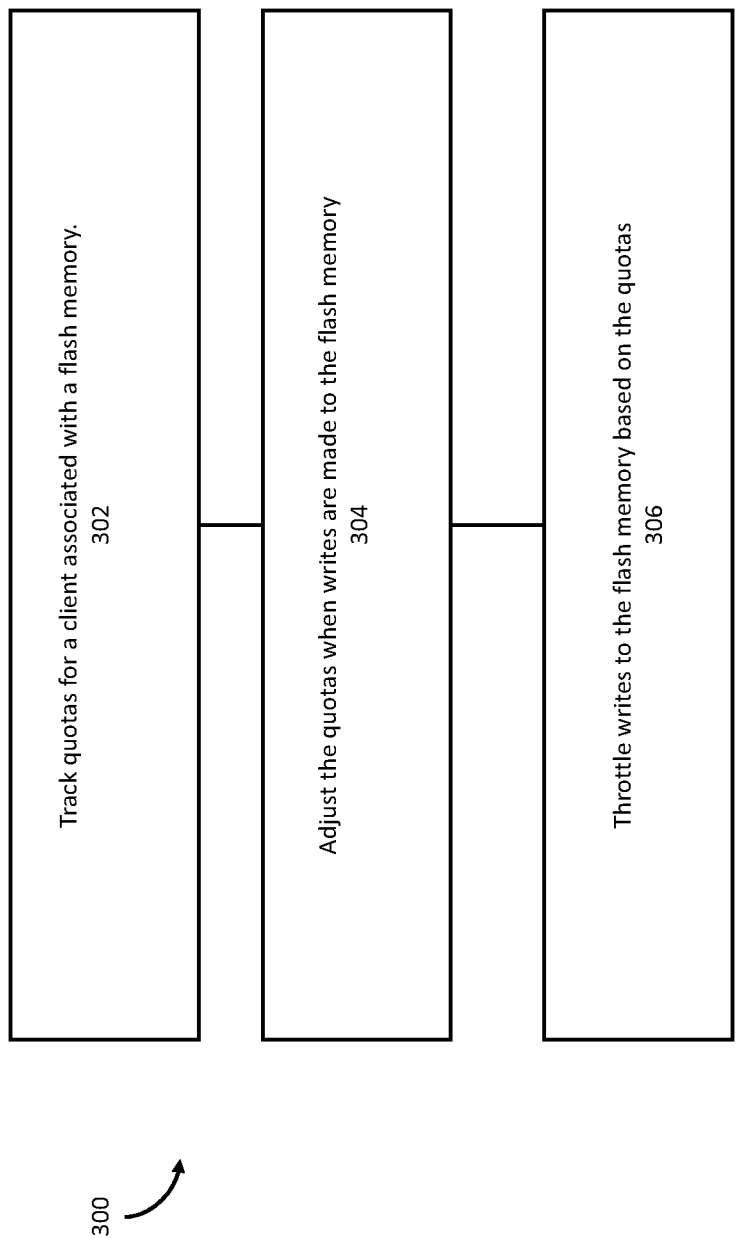
FIG. 3 illustrates an example of a method for managing a lifespan of a flash memory.

FIG. 3 illustrates an example of a method for managing a lifespan of a flash memory. The method 300 includes tracking quotas and throttling writes or access to the flash memory based on how the clients use their associated quotas or credits. In box 302, quotas for one or more clients are tracked, for example, by a flash memory manager. Each client is typically associated with a set of quotas including, by way of example, a total quota and a window quota. The total quota and the window quota of a particular client is some percentage of the total quota and window quota of the flash memory as a whole. If a client is allocated 50% of the writes, then the client's total quota is 50% of the total quota and the client's window quota is 50% of the overall window quota. In box 304, the writes performed by the clients are tracked. Alternatively stated, the credits of the clients are adjusted based on writes to the flash memory.

In box 306, writes to the flash memory are throttled based on the quotas. As previously stated, the quotas or use of the quotas can be tracked in different ways. For example, the quota may be decremented whenever a write is made. When the quota reaches zero, this indicates that the credits are used or that the quotas are exceeded. Alternatively, the total writes may be tracked and the window writes may be tracked. In another example, the quotas can be tracked, as previously stated, as follows:

Total quota=(total writes−total allowed writes)/total allowed writes;

Window quota=(window writes−window allowed writes)/window allowed writes.

Tracking the quotas in this manner may facilitate the ability to determine whether a client that has exceeded its quota is heading in the right direction (towards normal or expected usage) based on whether the quotas are negative or positive as previously described.

Embodiments of the invention may be implemented in different computing environments and systems including network environments and systems, stand-alone environments and systems, big data environments and systems, cloud environments and systems or the like or combinations thereof. Embodiments of the invention can accommodate different applications including backup applications, document management applications, contact or sales applications, database applications, big data applications, or the like or combination thereof The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, DRAM, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein. A controller may include a processor and memory and/or other computing chips.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing a lifespan of a flash memory, the method comprising:
    tracking, by a flash memory manager, writes to the flash memory by a first client, wherein the first client is associated with a quota;
    tracking the quota with respect to the writes to the flash memory;
    providing, by the flash memory manager, the first client with information regarding the writes and the quota;
    self-throttling, by the first client, the writes to the flash memory based on the information such that the writes remain within the quota; and
    throttling the first client, the flash memory manager, when the first client fails to self-throttle, wherein the flash memory manager throttles when the first client has exceeded a threshold associated with the quota.

2. The method of claim 1, wherein the quota comprises a total quota and a window quota, wherein the total quota is associated with a time that the flash memory has been installed and wherein the window quota is associated with a window of time.

3. The method of claim 2, wherein the first client self-throttles based on at least one of the window quota and the total quota.

4. The method of claim 3, further comprising permitting the first client to exceed the quota as long as a tendency of the writes is to return to a normal usage associated with the quota.

5. The method of claim 4, wherein the flash memory manager throttles the first client when the tendency of the writes is not expected to return to the normal usage within a predetermined period of time.

6. The method of claim 2, wherein when only one of the total quota and the window quota is exceeded, the first client does not self-throttle as long as the total quota and the window quota return to a normal quota usage within a predetermined time period.

7. The method of claim 1, wherein the quota is based on credits, the method further comprising:
allocating credits to the first client;
decrementing the credits as the credits are used.

8. The method of claim 1, further comprising sharing a quota associated with a second client with the first client.

9. The method of claim 1, wherein the quota includes a window quota, wherein the window quota is based on writes to the flash memory during a window of time and wherein the window quota is determined by: window quota =(window writes−window allowed writes)/window allowed writes.

10. The method of claim 9, wherein the quota includes a total quota, wherein the total quota is determined by:total quota=(total writes−total allowed writes)/total allowed writes.

11. The method of claim 10, further comprising allowing new writes to the flash memory when the total quota and the window quota are both less than zero.

12. The method of claim 10, further comprising self-throttling based on a threshold score for inserted data, a threshold file-priority, or based on a type of transaction to be performed in the flash memory.

13. The method of claim 1, further comprising changing the quota to account for excessive writes by the first client or by other clients.

14. The method of claim 1, further comprising notifying the first client of their usage.

15. A method for managing a lifespan of a flash memory, the method comprising:

tracking writes to the flash memory, by a flash memory manager, by each of a plurality of clients, wherein each of the clients is associated with a quota that is based on the lifespan;
tracking the quota, including the quota, for each of the clients, the quota including a window quota and a total quota;
determining that the first client exceeds the quota;
determining whether the first client is allowed to exceed the quota, wherein the first client is allowed to exceed the quota when write fractions associated with the quota indicate that writes exceeding the quota are needed;
throttling the first client when the first client exceeds the quota unless the client is allowed to exceed the quota, wherein the writes to the memory by the first client are allowed without throttling as long as usage of the quota returns to a normal quota usage within a predetermined time period.

16. The method of claim 15, wherein the writes of the first client are not throttled when the quota indicates that the writes of the first client are returning to acceptable values.

17. The method of claim 15, wherein the quotas of the clients are associated with credits, further comprising allocating unused write credits from other clients to the first client before determining whether to throttle writes of the first client.

18. The method of claim 15, wherein the flash memory notifies the first client of a status of the quotas of the first client, wherein the first client self-throttles its own writes to the flash memory.

19. The method of claim 18, further comprising self-throttling based on a threshold score for inserted data, a threshold file-priority, or based on a type of transaction to be performed in the flash memory.

* * * * *